United States Patent [19]
Ridley, Sr. et al.

[11] Patent Number: 5,785,369
[45] Date of Patent: Jul. 28, 1998

[54] APPARATUS FOR THE COLLECTION OF DEBRIS

[75] Inventors: Andre Ridley, Sr.; Andre Ridley, Jr.; Andrea D. Ridley, all of Newton, Mass.

[73] Assignee: Inventions Unlimited, LLC, Newton, Mass.

[21] Appl. No.: 615,545

[22] Filed: Mar. 11, 1996

Related U.S. Application Data

[63] Continuation-in-part of Ser. No. 234,428, Apr. 28, 1994, Pat. No. 5,498,046.

[51] Int. Cl.$^6$ ............................................. B65B 67/04
[52] U.S. Cl. ........................ 294/1.1; 294/55; 15/257.1
[58] Field of Search ........................ 294/1.1, 1.3–1.5, 294/55, 57; 15/257.1, 257.3, 257.9; 248/95, 97, 99, 101; 141/108, 391

[56] References Cited

U.S. PATENT DOCUMENTS

| | | | |
|---|---|---|---|
| D. 267,357 | 12/1982 | Hillstrom | 294/55 |
| 341,175 | 5/1886 | Shaw | 15/257.9 |
| 571,513 | 11/1896 | Davidson | 294/1.1 |
| 1,167,782 | 1/1916 | Richards | 294/1.1 |
| 1,212,305 | 1/1917 | Worsell | 294/55 |
| 4,149,745 | 4/1979 | Willis | 15/257.1 |
| 4,447,082 | 5/1984 | Lindholm | 294/1.4 |
| 4,629,233 | 12/1986 | Pfisterer | 294/1.1 |
| 4,659,045 | 4/1987 | Flynn | 294/1.1 |
| 4,723,803 | 2/1988 | Sapp | 294/1.1 |

*Primary Examiner*—Dean Kramer
*Attorney, Agent, or Firm*—Choate, Hall & Stewart

[57] ABSTRACT

The present invention comprises an apparatus and a method for collecting leaves and other debris. The apparatus consists of two components, the first of which comprises a chute having a forward-projecting member for scooping and gathering debris, the second of which comprises an apparatus having a housing into which one's hand and arm may be inserted and a tool for gathering debris, the tool of which projects from or attaches to the housing. The two components may be used independently, or, more preferably, in concert with each other for maximum ease and efficiency in the collection of debris.

8 Claims, 9 Drawing Sheets

APPARATUS FOR THE COLLECTION OF DEBRIS

This application is a continuation-in-part of U.S. application Ser. No. 08/234,428, filed Apr. 28, 1994, now U.S. Pat. No. 5,498,046, which is herein incorporated by reference. This invention relates to an apparatus and a method for collecting leaves and other debris.

BACKGROUND OF THE INVENTION

The manual collection and disposal of debris, such as leaves and litter, can be an arduous and time-consuming task. In order to collect and dispose of leaves and other debris, one of two standard procedures is usually carried out: one procedure is for a person to hold a plastic bag open in contact with the ground by one hand, and to rake the leaves into the open end of the bag with a long handled rake which is held by the other hand close to the rake head; another procedure involves two persons, one of whom holds the bag open with both hands and the other of whom collects piles of debris and deposits the piles into the plastic bag. Both procedures are unwieldy, time-consuming and exhausting, requiring much squatting, stooping and bending.

As a result, many devices aimed at decreasing the labor involved in collecting debris have been invented. These devices essentially fall into three categories: the first category comprises frames for holding trash bags open; the second comprises chutes for transferring debris into trash bags as the bags are held open by the chutes; lastly, the third category comprises special types of rakes for gathering debris without bending. Although these devices have been a step in the right direction, all of them have certain drawbacks which hamper the process of collecting and disposing of leaves and other debris.

Frames

The object of a frame is to hold a trash bag open, as debris is raked or otherwise deposited into the bag. A frame is operated by inserting it inside a bag, ear the bag's perimeter, so that the inner surface of the bag rests against the outer surface of the frame, thereby holding the bag open. Thus, in principle, by freeing up one's hands for other tasks, a frame makes the process of collecting debris more efficient, particularly for a single worker, who generally needs both hands for leveraging a rake. In practice, however, frames do not operate so smoothly and effortlessly.

In most instances, the preferred method of utilizing a frame to collect debris involves standing the frame vertically, so that the plane containing the opening of the frame and the opening of the bag is perpendicular to the surface and the frame is in contact with the surface on which the debris is located. Thus, debris may be raked or otherwise deposited directly into the bag, without having to lift the debris to reach the height of the bag's opening.

Frames, however, tend to be thin, flimsy and lightweight, so that they are either incapable of standing vertically or fall over easily, particularly when placed on an uneven surface, such as a bumpy lawn. Thus, in order to stabilize a frame so that it is operable vertically, one must bend to reach and hold the frame steady at ground level with one hand, while attempting to rake the debris through the inner perimeter of the frame and into the bag, with the other hand. This technique is both clumsy and, because of the bending involved, physically uncomfortable.

Another drawback of frames is that they tend to be difficult to assemble inside trash bags so that the bags fit smoothly and securely around the outer surface of the frames. Failure to achieve a smooth, tight fit leaves gaps through which debris can exit a bag as the debris is forced through the frame and into the bag. Bags that are not securely attached can fall or be pulled easily off of the frames, particularly when forcefully depositing debris or when using tools having parts that can accidentally catch or tear bags, such as the tines of a rake. Because they do not have a large outer surface area onto which the inner surface of bags may be contacted, thin frames tend to be particularly problematic in terms of achieving a smooth and secure attachment. Although such frames often have devices for clamping bags to the frames, these devices tend to be poorly and awkwardly designed.

Lastly, frames are generally incapable of operating as scoopers for scooping debris up and into trash bags attached to the frames. Thus, frames cannot be used independently, without the use of one's hands, a rake or some other tool, for depositing debris into the bags. There are at least two key features that play an important role in a device's ability to be manipulated as a scooper. One feature comprises a forward-projecting scoop. Rather than a scoop, some frames have a slight ramp that, by inclining to meet the ground, serves much like a dustpan onto which debris may be raked or swept. Although such ramps are useful, particularly when sweeping small particles, they generally do not have the dimensions and curvature to function as scoops, as well as ramps.

The other key feature comprises a sturdy, conveniently-located and optimally-oriented handle. Although some frames have handles, the handles are typically designed for purposes that negate their uses for scooping. For example, many frames have handles that may be grasped to pick up and put the frames away. Because the location of a handle that serves this purpose is not critical, the handles on such frames are often located on the sides or the bottom, rather than the top of the frame. Furthermore, even when a handle is located on the top of the frame, it is often oriented so that one would have to twist his arm in an awkward and uncomfortable manner in order to lift and swing the frame by the handle.

Chutes

As with a frame, the primary object of a chute is to hold a trash bag open. A chute resembles a trash can or bucket without a bottom and is operated by placing the inner surface of a bag around the outer surface of one end of the chute, so that debris may be swept or raked through the chute and collected into the bag. As used hereinout, the vertical position of a chute is defined as the position in which the back opening of a chute lies planar against a surface and the horizontal position is defined as the position in which the planes containing the front and back openings are substantially perpendicular to the surface.

In addition to many of the drawbacks discussed above with regard to frames, another significant disadvantage of chutes is that they tend to be incapable of standing on a surface in both the vertical and horizontal positions. The most common causes for this lack of flexibility include the lack of a planar surface on which to stand the chutes in both directions, the inopportune location of features, such as clamps, that tip the chutes and prevent portions of the chutes from contacting a surface, and an unbalanced distribution of mass that causes the chutes to fall onto the heaviest portion of the chutes.

The incapability of chutes to stand in more than one position gives them less operating flexibility. For example, a chute designed to stand in the horizontal position only can be readily used to collect debris located on a surface, since no lifting is required to reach the opening of the chute.

However, such a chute cannot be used to readily collecting debris located above surface level. The latter task requires a chute capable of standing in the vertical position, so that the debris can simply be swept or dumped over the opening of the chute so that the force of gravity causes the debris to fall into the channel of the chute. Chutes having the stability to stand in only one position are not only less operable, but, in addition, have fewer storage options, particularly those chutes whose one stable standing position requires contact with a large surface area—in other words, takes up a lot of space.

Lastly, as with frames, most chutes lack the key features of a forward-projecting member having the dimensions and curvature necessary for serving as a scoop and a conveniently-located and optimally-oriented handle for lifting and swinging the chute in a scooping motion. Furthermore, chutes tend to be designed to optimize one of two functions, both of which have thus far been mutually exclusive of each other: that is, chutes tend to be either heavy and bulky so that they can firmly stand on a surface without tipping or scooting, but cannot be easily lifted, or, chutes tend to be lightweight and flimsy, so that they can easily be manipulated in a scooping motion, but have no stability when standing.

Rakes

The most common type of rake is the standard, long-handled rake. For optimum ease and efficiency, this type of rake is operated using both hands and arms—for example, for right-handed people, this process usually involves holding the right arm straight, while using the right hand to grasp the rake handle at a location approximately one-third up from the base; the left arm is bent at the elbow, while grasping the rake handle at a location several inches above the right hand. Thus, keeping the right arm approximately straight, the rake can be operated with a maximum degree of leverage.

In order to eliminate the need to use both hands for raking, short rakes requiring less leverage than long-handled rakes have been invented. In place of the long handle, many short rakes have a cuff through which one's arm may be slipped and a handle placed below the cuff, on the rake head, which one's fingers may be curled around to manipulate the rake. A short rake can be advantageous over a long-handled rake when a free hand is needed for performing operations such as holding a trash bag open.

One of the most notable disadvantages of short rakes, however, is that one must bend, squat or kneel when using a short rake to rake debris below arm length, particularly debris located at ground level. Not only is this hard on one's back and knees, but it often places one in the unfortunate circumstance of having to bend, squat or kneel on a slippery, wet surface, such as wet grass. In addition, one's body, particularly his hands and arms, being closer to the debris, become more exposed to the debris. When cleaning up dirty or contaminated debris, such as broken glass or used syringes, or when working in areas with thorny bushes, poison ivy, or other hazards, such exposure must be avoided.

Another type of rake comprises a short rake with a detachable long handle that enables one to switch back and forth from the short to the long version of the rake, depending upon which version is safer and more convenient. Thus, to avoid exposure to hazards or to be able to stand while raking, the long-handled version of the rake may be utilized. However, attaching and detaching the handle can be a nuisance more importantly, when using the long-handled version of the rake, the person operating the rake is back to square one—he has to tie up both hands to leverage the rake with a maximum degree of ease and efficiency.

In order to make the task of collecting debris less onerous, time-consuming and physically demanding, a need has thus arisen for improved rakes and other tools that provide protection of the hand and arm against debris and that can be readily manipulated single-handedly while standing. Furthermore, a need has arisen for a device capable of holding a container, such as a trash bag, open as debris is raked, dumped or otherwise deposited into the container. The device should be operable and stable in both the vertical and horizontal positions, so that the device can be conveniently stored and, more importantly, so that it can withstand the sometimes rough force of filling it with debris, without the need for one or both hands to steady it in position. Lastly, the device should be readily and single-handedly manipulable as a scooper for scooping debris, so that debris may be collected independently, without the use of a second tool, such as a rake.

SUMMARY OF THE INVENTION

The present invention disclosed herein comprises an apparatus and a method for collecting leaves and other debris. The apparatus consists of two components that may be used independently, or, more preferably, in concert with each other for maximum ease and efficiency in the collection of debris. The first component comprises a dual-purpose apparatus which may be used as a scooper and as a chute for collecting debris. In another embodiment of the invention, this component may serve as a container, such as a trash or laundry bin, as well. The second component comprises a tool for gathering and scooping debris which, for example, in one embodiment may comprise a rake and, in another embodiment, may comprise a broom, as is explained in more depth below.

First Component

The first component is comprised of a casing, preferably made from a lightweight, yet sturdy plastic, such as a polyethylene. The casing has front and back openings, through which extends a channel, and a substantially planar member that projects forward from one side of the front perimeter defining the front opening. The forward-projecting member has a front edge and two curved edges located on opposite sides of the center, perpendicular to the front edge. The apparatus further includes a handle located on the opposite side of the casing from which the forward-projecting member extends, so that, when the apparatus is positioned horizontally, the handle is located at the top of the apparatus, on the highest point of the outer surface of the casing. In addition, the handle is oriented so that its ends point toward the front and back openings of the casing, along the axis of the channel.

The apparatus is capable of standing with extraordinary stability in both the vertical and horizontal positions, which were previously defined with regard to chutes. Thus, with a container, such as a trash bag, enveloping the back opening of the casing, several techniques, including those described as follows, may be used to collect debris.

One technique comprises setting the apparatus stationary in the horizontal position on a surface, so that the center of the forward-projecting member lies planar against the surface and the front opening is in contact with the surface. The forward-projecting member serves as a ramp having a front edge that meets the surface, so that debris may be raked or swept onto the forward-projecting member and into the channel, and curved side edges for preventing the debris from falling off of the forward-projecting member.

Another technique involves setting the apparatus stationary in the vertical position on a surface, so that the back perimeter lies in contact with the surface and the front opening is at a height above the surface. This technique is particularly useful for collecting debris located above the height of the front opening, for example, debris located on a table. By positioning the front opening of the apparatus just below or adjacent to the surface on which the debris is located, the debris may simply be brushed off of the surface, over the front opening and, through the force of gravity, into the channel.

Alternatively, the convenient location and optimal orientation of the handle enable one to grasp the handle and, with no awkward twisting, to readily manipulate the apparatus in a scooping motion, with the forward-projecting member serving as a scoop. The rounded shape and lightweight construction of the apparatus allow one to fluidly and quickly scoop, with minimal wrist and arm exertion, thereby further contributing to the unique ability of the apparatus to be utilized in this manner.

Using any of these techniques, once the channel becomes full, the apparatus is simply tipped upright, so that the debris slides from the channel and into the container, while the back opening of the apparatus remains enveloped by the container. The apparatus is then lifted out of the container, leaving the debris intact inside the container.

Second Component

The second component comprises an apparatus having a utensil for gathering debris. The apparatus includes a housing having a distal end from which the utensil projects, a cavity into which one's hand and arm is inserted and a cylindrical handle mounted transversely inside the cavity. In order to gather debris, one simply grasps the handle and, with his wrist held in a comfortably straight position, moves his arm in the direction that he wishes to move the utensil. Thus, the apparatus functions like a natural extension of one's arm. This harmony with one's natural movement enables the apparatus to be readily manipulated single-handedly with ease and efficiency, regardless of the length of the apparatus. Furthermore, the housing protects one's hand and arm from hazards, such as broken glass or poison ivy, that one might encounter while operating the apparatus.

The utensil may be comprised of a number of devices, including, for example, shovels, brooms, hoes and rakes. In the preferred embodiment, the utensil comprises a plurality of tines adaptable for raking debris. The plurality of tines curve inward from left to right and from top to bottom, to collectively form the shape of a shovel. The curvature of the tines gives this embodiment a dual-functionality of operating as a scooper, as well as a rake. Thus, the apparatus may be operated as a rake for gathering debris into a pile and as a scooper for scooping the pile of debris into a container.

Preferred Embodiment

Because of the dual-functionality of both the first and the second component, both components may be utilized independently from each other and from other devices for collecting debris. However, in the preferred embodiment of the invention, the two components are operated in concert with each other for maximum ease and efficiency in collecting debris. For example, in order to collect and dispose of debris, one may choose to operate the first component, comprising a chute having a forward-projecting scoop, along with the embodiment of the second component in which the utensil comprises a plurality of tines curved like a shovel. Thus, using the second component, one may rake and scoop debris into the casing of the first component, while simultaneously manipulating the first component to scoop up the debris, as well as to receive the debris deposited into it by the second component.

DETAILED DESCRIPTION OF THE INVENTION

The present invention disclosed herein comprises an apparatus and a method for collecting leaves and other debris. The apparatus consists of two components that may be used independently, or, more preferably, in concert with each other for maximum ease and efficiency in the collection of debris.

First Component

Figure 1:
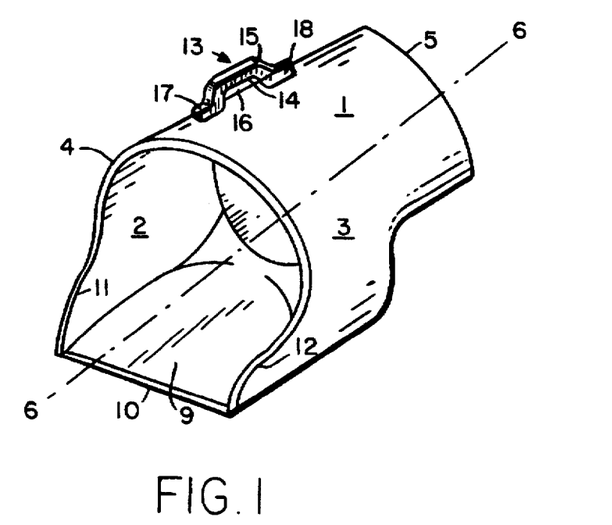
FIG. 1 illustrates a perspective view of the first component positioned horizontally on a surface.
Figure 2:
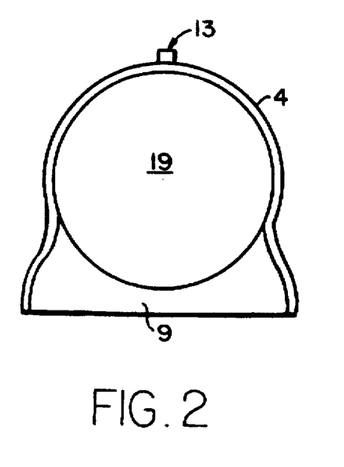
FIG. 2 illustrates a cross-sectional view of the apparatus of FIG. 1.

The first component comprises a dual-purpose apparatus, preferably made from a lightweight, yet sturdy plastic, such as a polyethylene, which may be used as a scooper and as a chute for collecting debris. FIG. 1 illustrates a perspective view of the apparatus positioned horizontally on a surface. The apparatus comprises a casing 1, having inner and outer surfaces 2 and 3, a front perimeter 4 and a back perimeter 5 that is shorter than the front perimeter 4. The inner surface 2 and the front and back perimeters 4 and 5 define a channel aligned along an axis 6, intersecting a front and back opening of the casing. The bottom of the front perimeter 4 further comprises a substantially planar forward-projecting member 9, having a front edge 10 and curved side edges 11 and 12, located opposite to each other and perpendicular to the front edge 10. In addition, the apparatus includes a handle 13 having an inner surface 14 and an outer surface 15. The handle 13 is mounted to the outer surface 3 of the casing, so that, when the apparatus is positioned horizontally, the handle 13 is located at the top of the outer surface 3 of the casing 1. The inner surface 14 of the handle 13 and the top of the outer surface 3 of the casing define an aperture 16, through which one's hand may be slipped for grasping the handle 13. The handle 13 has first and second ends 17 and 18 aligned along the axis 6 of the channel. FIG. 2 illustrates a cross-sectional view of the apparatus of FIG. 1 in the horizontal position, in which the front opening 19, front perimeter 4, handle 13 and forward-projecting member 9 can be viewed. Lastly, in order to provide the casing 1 with additional structural stability, in an alternative embodiment, all or portions of the front and back perimeters 4 and 5 may be encircled by a rigid rim.

Figure 3:
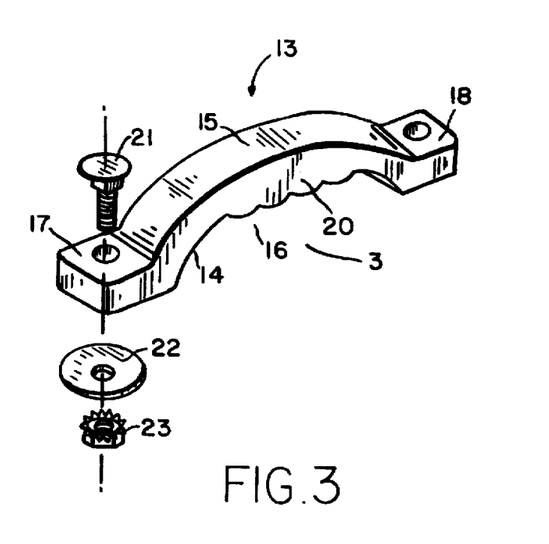
FIG. 3 illustrates an exploded perspective view of the handle on the apparatus of FIG. 1.

FIG. 3 is an exploded perspective view of the handle on the apparatus of FIG. 1. The handle 13 has inner and outer surfaces 14 and 15 and first and second ends 17 and 18 for mounting onto the top of the outer surface 3 of the casing 1. The inner surface 14 of the handle 13 and the outer surface 3 of the casing define an aperture 16, through which one's hand may be slipped, in order to grasp the handle 13 and thereby lift the apparatus. In addition, the inner surface 14 of the handle 13 may include a plurality of grooves formed therein, for more easily gripping the handle. One of the grooves comprising the plurality of grooves is labeled 20.

The handle may be mounted to the casing using a number of methods, including, for example, welding or attaching with fasteners such as bolts. FIG. 3 illustrates, for example, how a bolt 21, washer 22 and nut 23 might be configured to attach the ends 17 and 18 of the handle 13 to the casing. Alternatively, in order to eliminate the step of attaching the handle 13 to the apparatus, the handle 13 may be formed from the same plastic mold as the casing 1, so that the handle 13 and the casing 1 comprise one integral unit.

Figures 4, 5, 6, 7:
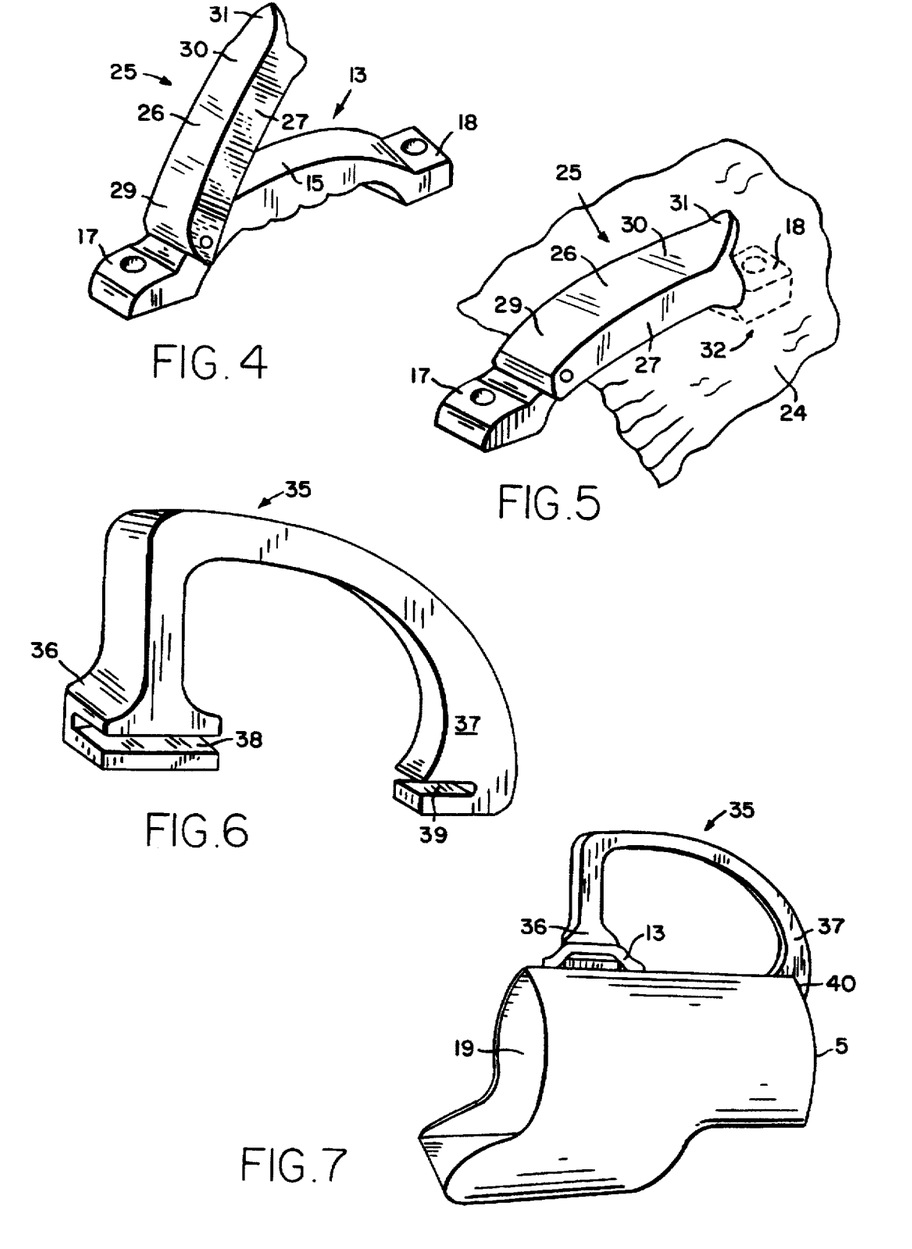
FIG. 4 illustrates a perspective view of a locking member attached to the apparatus of FIG. 1.
FIG. 5 illustrates a perspective view of the locking member of FIG. 4.
FIG. 6 illustrates an exploded perspective view of a detachable handle, which may be attached to the apparatus of FIG. 1.
FIG. 7 illustrates a perspective view of the apparatus of FIG. 1, with a detachable handle attached.

FIGS. 4 and 5 illustrate horizontal side views of an alternative embodiment of the apparatus of FIG. 1, in which the apparatus further comprises a locking member 25 for securing a bag 24 to the apparatus, so that the back opening of the apparatus remains enveloped by the bag 24 as debris is collected. The locking member 25 has a top 26, a first side 27 and a second side (not shown), the two sides of which are located opposite to each other and perpendicular to the top 26. The locking member 25 is dimensioned to snugly overlap a portion of the outer surface 15 of the handle 13. The locking member 25 has first and second ends 29 and 30 located opposite to each other. The first end 29 is attached near the first end 17 of the handle 13 in a manner that allows the locking member 25 to swivel between an open position, as illustrated in FIG. 4, and a closed position, as illustrated in FIG. 5. The dotted lines 32 in FIG. 5 represent the second end 18 of the handle 13 that is covered by the bag 24.

FIGS. 4 and 5 also illustrate an outward-projecting tip 31 which may be formed into or attached onto the second end 30 of the locking member 25, so that the locking member 25 can be easily moved by inserting the tip 31 between two fingers and applying a slight force.

In order to secure a bag 24 to the apparatus, as illustrated in FIG. 5, a portion of the bag perimeter may be positioned against the outer surface 15 of the handle 13, while the locking member 25 is in the open position. The locking member 25 is then snapped into the closed position, so that the bag becomes trapped between the outer surface 15 of the handle and the inner surface of the locking member 25.

FIG. 6 illustrates an exploded perspective view of a detachable handle, which may be attached to the apparatus of FIG. 1, as illustrated in the perspective view of FIG. 7. The detachable handle 35 has first and second ends 36 and 37, the first end 36 of which has a slot 38 formed therein for engaging the handle 13, and the second end 37 of which has a slot 39 formed therein for engaging a portion 40 of the back perimeter 5 of the casing.

One object of the detachable handle 35 is to extend the height from which the apparatus may be held and manipulated, so that people of various physiques can operate the apparatus, without having to bend. The other object of the detachable handle 35 is to secure a bag to the apparatus, so that the bag remains enveloped around the back opening of the apparatus as debris is collected. In the latter case, the first step of securing the bag comprises pulling the bag over the back opening of the apparatus and toward the front opening 19, so that a portion of the inner surface of the bag rests against the handle 13. The slots 38 and 39 are then engaged, respectively, with the handle 13 and the portion 40 of the back perimeter 5 of the apparatus, so that a first portion of the bag becomes trapped between slot 38 and handle 13 and a second portion of the bag becomes trapped between slot 39 and the portion 40 of the back perimeter 5 of the casing.

Figures 8, 9:
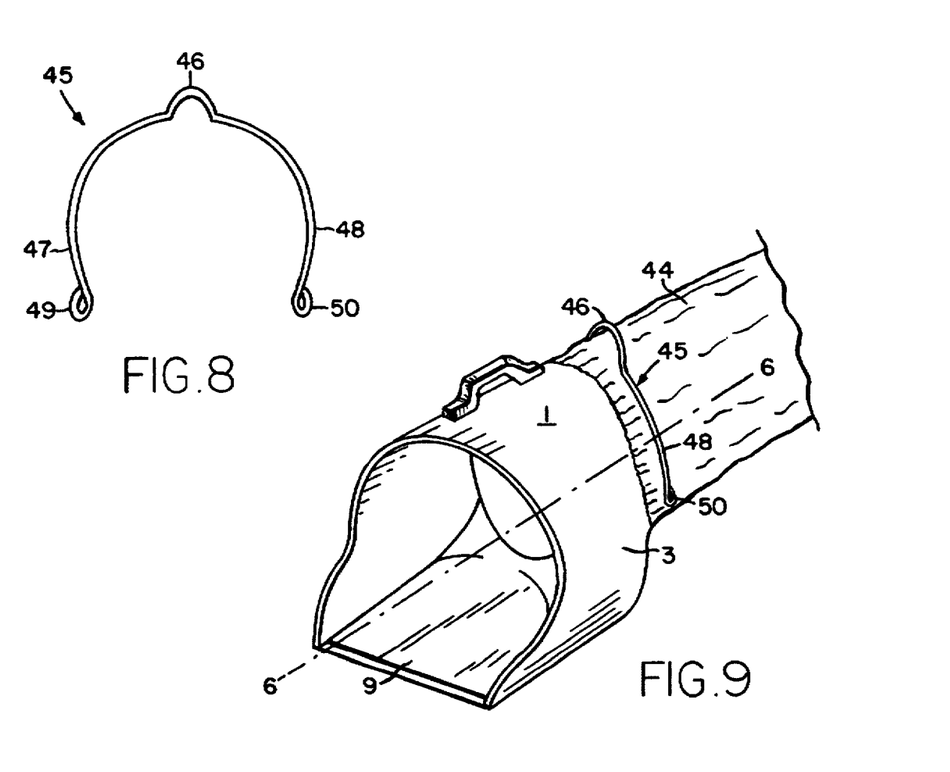
FIG. 8 illustrates a cross-sectional view of a clamp, which may be used to secure a container to the apparatus of FIG. 1.
FIG. 9 illustrates a perspective view of the apparatus of FIG. 1, with a bag clamped onto the apparatus.

FIG. 8 illustrates a cross-sectional view of a circularly-shaped clamp 45 that, in yet another alternative embodiment of the apparatus of FIG. 1, may be utilized to secure a container, such as a paper bag, to the apparatus, so that the container remains enveloped around the back opening of the casing 1, during use of the apparatus. FIG. 9 illustrates a perspective view of the apparatus of FIG. 1 in the horizontal position, with a paper bag 44 attached by the clamp 45 to the outer surface 3 of the casing 1 of the apparatus.

The clamp 45 is designed to tightly encircle a portion of the outer surface 3 of the casing 1 and a container attached to the apparatus, by applying an inward force on the apparatus and the container, perpendicular to the axis 6 of the channel. The clamp 45 includes a center arch 46 for grasping and positioning the clamp 45 and first and second ends 47 and 48, opposite to each other. In order to prevent damage to apparatus and the container and injury to the person manipulating the clamp 45, the ends 47 and 48 of the clamp curl outward, away from the center of the clamp, thereby forming complete loops 49 and 50. When utilizing a paper bag as the container, the outwardly-curling loops 49 and 50 are particularly important because they prevent the ends 47 and 48 of the clamp 45 from ripping the bag.

Figure 10:
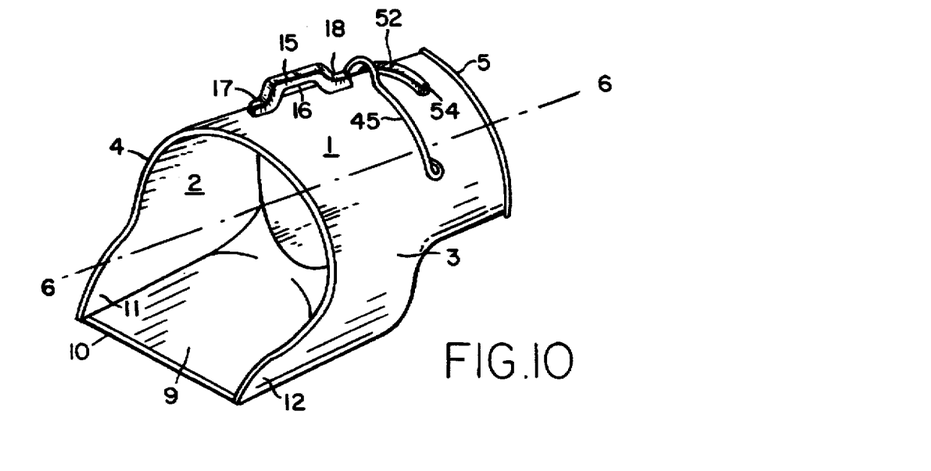
FIG. 10 illustrates a perspective view of an alternative embodiment of the apparatus of FIG. 1, with a clamp encircling a portion of the apparatus.

In addition, the apparatus may further comprise an outward-projecting ridge 52 formed onto the outer surface 3 of the casing 1, as illustrated in FIG. 10, which is a perspective view of the apparatus, with the clamp 45 encircling a portion of the outer surface 3 of the casing 1. The outward-projecting ridge 52 has a first end (not visible) and a second end 54 directed along an axis perpendicular to the axis 6 of the channel. By positioning the clamp 45 between the front opening and the outward-projecting ridge 52, the outward-projecting ridge 52 serves as a barrier for preventing the clamp 45 from scooting backward, toward the back perimeter 5 of the casing, where it could spring off due to the force acted on the clamp 45 by the casing 1.

Figure 11:
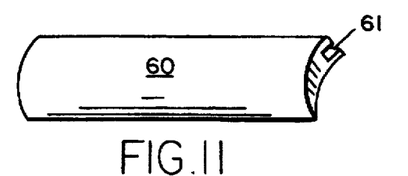
FIG. 11 illustrates a perspective view of a detachable ramp, which may be attached to the apparatus of FIG. 1.
Figures 12, 13, 14, 15:
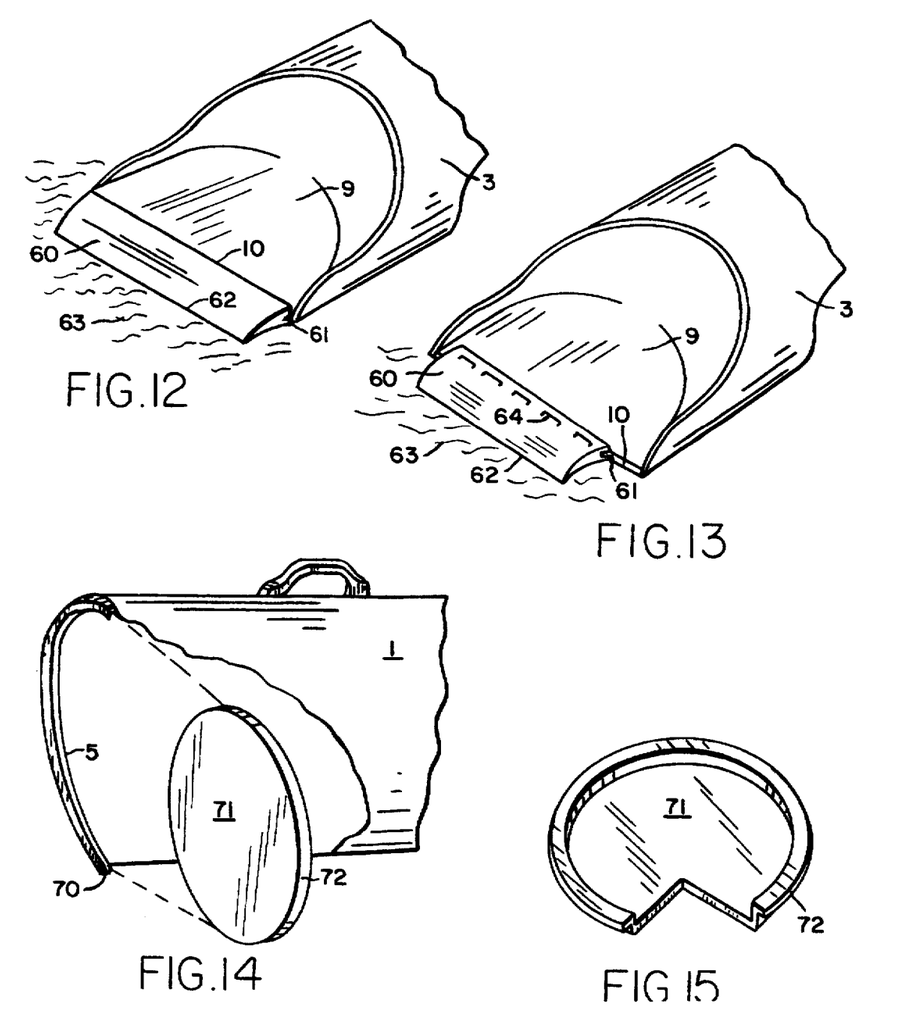
FIG. 12 illustrates a perspective view of a portion of the apparatus of FIG. 1, with a detachable ramp engaged with the apparatus.
FIG. 13 illustrates a perspective view of a portion of the apparatus of FIG. 1, with a detachable ramp attached to the apparatus.
FIG. 14 illustrates a perspective view of a portion of an alternative embodiment of the apparatus of FIG. 1, in which, for illustrative purposes, a portion of the apparatus is cut away.
FIG. 15 illustrates a perspective view of a substantially planar lid, which may be attached to the apparatus of FIG. 1.

FIG. 11 is a perspective view of a detachable ramp 60, which, in an alternative embodiment of the apparatus, may be attached to the apparatus, as illustrated in the perspective view of the apparatus in FIG. 12. The detachable ramp 60 has a slot 61 that may be engaged with the front edge 10 of the forward-projecting member 9. The ramp 60 further comprises a thin front edge 62, located opposite to the slot 61, that inclines downward to meet a surface 63 on which the apparatus is horizontally positioned, thereby forming a seal between the front edge 62 of the ramp 60 and the surface 63. By forming a seal, the ramp 60 prevents fine debris, such as powder, dirt and sand, from sliding underneath, rather than onto, the forward-projecting member 9 of the apparatus during sweeping or raking. In order to form a good seal, the ramp 60 is preferably made from rubber.

In an alternative embodiment of the invention, the ramp 60 may be permanently attached to the front edge 10 of the forward-projecting member 9 by various methods, including the use of staples, one staple of which is labeled 64 in the illustration of FIG. 13, which is a perspective view of the apparatus of FIG. 1 in the horizontal position.

FIG. 14 illustrates a perspective view of a portion of an alternative embodiment of the apparatus of FIG. 1, in which, for illustrative purposes only, the back perimeter 5 and a back portion of the casing 1 is cut away. In this embodiment, the back perimeter 5 of the casing 1 includes a groove 70 formed therein. This embodiment further comprises a detachable, substantially planar lid 71 having a ridge 72 around its perimeter, the ridge 72 being dimensioned to fit snugly into the groove 70 of the casing 1. The ridge 72 on the lid 71 can be more clearly seen from FIG. 15, which illustrates a perspective view of the lid 71. The object of the lid 71 is to cover the back opening of the apparatus, so that debris and other materials located within the channel of the apparatus may be contained.

Stability in the Horizontal and Vertical Positions

Figure 16:
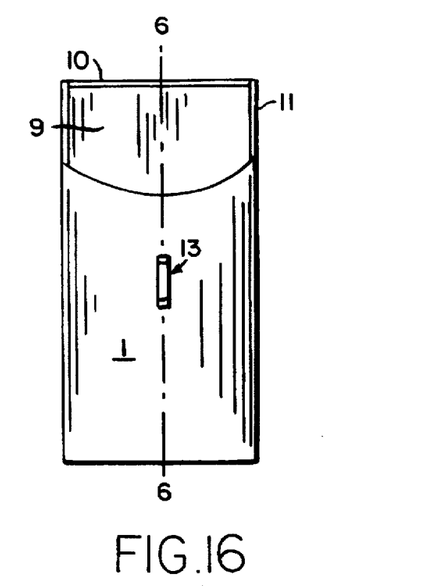
FIG. 16 illustrates a perspective view of the apparatus of FIG. 1 in the vertical position.

In order to contain debris within the channel during collection of the debris, the apparatus may be operated with either a lid, such as the lid 71 of FIG. 14, attached to the back perimeter of the casing, or a container, such as a box or plastic trash bag, enveloped around the back opening of the casing. Using either a lid or a container, the apparatus can then be operated by employing at least three different techniques, two of which depend on the superior stability with which the apparatus is capable of standing in both the horizontal and vertical positions. FIG. 1 illustrates a perspective view of the apparatus in the horizontal position. FIG. 16 illustrates a perspective view of the apparatus in the vertical position. The characteristics and features of the apparatus that render it stable in both positions are discussed below.

As illustrated in FIG. 1, in the horizontal position, the substantially planar forward-projecting member 9 lies planar against a surface, thereby forming a large area of contact between the member 9 and the surface. This large area of contact imparts the apparatus with enormous stability, so that the apparatus is capable of remaining intact on the surface, without easily budging, even as debris is forcefully raked or otherwise deposited onto the forward-projecting member 9 and into the channel.

In the vertical position, as illustrated in FIG. 16, the back perimeter 5 of the casing 1 lies planar against a surface on which the apparatus is standing and the forward-projecting member 9 and the axis 6 of the channel are oriented substantially perpendicular to the surface. Because the back perimeter 5 is planar, the surface and the entire back perimeter 5 form a large area of contact therebetween. Moreover, with a substantially planar lid attached to the back perimeter 5, such as the lid 71 illustrated in FIG. 14, the contact area between the surface and the apparatus is even greater; thus, in this embodiment, the stability of the apparatus is greater, as well. In addition to the stability imparted by the large contact area between the back perimeter 5 and the surface, the balanced distribution of mass of the apparatus further enhances the stability in the vertical position.

The stability of the apparatus in both the horizontal and vertical positions eliminates the need to tie up one or more hands to steady the apparatus while collecting debris. This can be particularly advantageous when both hands are needed for other operations, such as manipulating a long-handled rake or grasping piles of debris with both hands and dumping the debris into the channel. Moreover, the ability of the apparatus to stand in both the vertical and horizontal positions provides more options for conveniently storing the apparatus.

Operation in the Vertical Position as a Chute

In the vertical position, a container such as a box or a bag, may be enveloped around the back opening of the casing, thereby enabling the apparatus to operate as a chute for holding open and filling the container.

Figure 17:
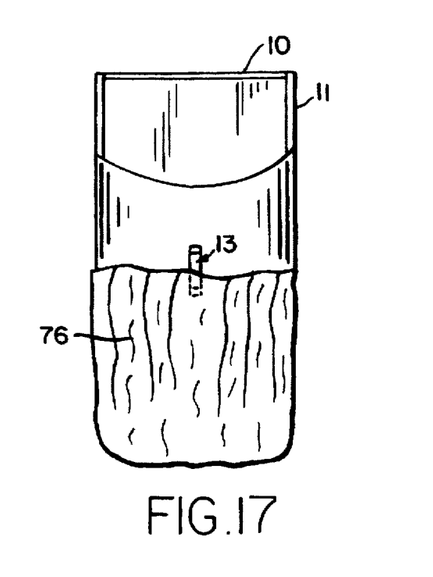
FIG. 17 illustrates a vertical perspective view of the apparatus of FIG. 1, with a bag enveloped around the back perimeter.

One technique for enveloping a container, such as a box, around the back opening of the casing comprises setting the container on a surface with its opening pointing up, and then lifting the apparatus up and into the opening of the container, so that the back perimeter 5 of the apparatus rests inside the container. For a flexible container, such as a plastic trash bag, a more effective technique comprises flipping the apparatus upside down, so that a portion of the front perimeter 4 rests against a surface, slipping the container over the back opening of the apparatus, and then, while holding the container in place, simply flipping the apparatus right side up and into the vertical position, as illustrated in FIG. 17, which is a perspective view of the apparatus 75, with a bag 76 enveloped around the back opening of the apparatus 75.

In order to hold a flexible container, such as a plastic trash bag, in place during vertical operation of the apparatus, the container may be secured to the apparatus by numerous devices, including, for example, the clamp 45 of FIG. 8, the locking member 25 of FIGS. 4 and 5, or the detachable handle 35 of FIGS. 6 and 7, all of which were previously discussed in depth, above.

After the container and apparatus is secured and ready to operate in the vertical position, debris may be collected and tossed into the channel of the apparatus by shoveling, scooping or, for debris located at table height, sweeping the debris over the front opening of the apparatus, so that the debris falls into the channel through the force of gravity. Once the channel of the apparatus becomes full with debris, the apparatus may simply be lifted up and out of the container, so that the debris slides from the channel and into the container.

Using a slightly different technique, the apparatus may be operated by substituting the container with a lid, such as the substantially planar lid 71 of FIG. 14, which may be attached to the back perimeter 5. Once the channel of the apparatus becomes full, the back opening of the apparatus may be held over a separate container, such as a trash can, and the lid removed so that the debris slides from the channel and into the separate container. Alternatively, the lid may be left attached, so that the apparatus functions vertically as a bin for containing items such as toys, laundry or trash.

Operation in the Horizontal Position as a Chute

Figure 18:
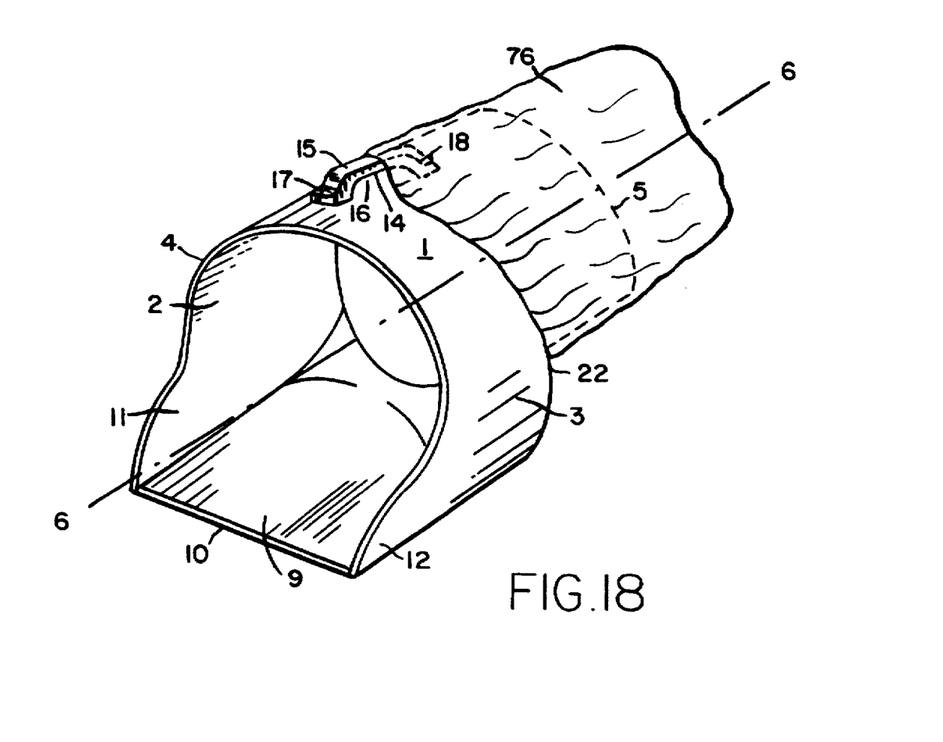
FIG. 18 illustrates a horizontal perspective view of the apparatus of FIG. 1, with a bag enveloped around the back perimeter.

FIG. 18 illustrates a perspective view of the apparatus of FIG. 1, in the horizontal position, with a bag 76 slipped over the back opening of the casing 1. The dotted lines in FIG. 18 represent the portion of the apparatus lying inside the bag 76. The simplest technique for enveloping a bag or other type of container around the back perimeter of the apparatus, as illustrated in FIG. 18, comprises flipping the apparatus upside down so that the front perimeter 4 is in contact with a surface, slipping the container over the back opening of the apparatus, pulling the container as far forward toward the front perimeter 4 as possible, and then, while holding the container in place, simply turning the apparatus sideways and standing it on the surface in the horizontal position.

Due to the length and width of the apparatus, the container may be pulled forward, toward the front opening of the apparatus, so that it extends well beyond the back perimeter 5 of the casing 1 and contacts a large outer surface area of the apparatus. As a result, a container may be firmly and securely enveloped around the back opening of the casing 1, so that no gaps form through which debris may accidentally slip as the debris is forced from the channel and into the container. Moreover, as is illustrated in FIGS. 1 and 18, in order to further secure a bag around the apparatus as the apparatus rests horizontally on a surface, the preferred embodiment of the apparatus curves inward, where the outer surface 3 of the casing and the bottom surface of the forward-projecting member 9 merge, thereby forming a recess 22, into which a portion of the bag perimeter may be inserted.

Numerous additional devices may be employed, as well, to form an even more secure attachment between the container and the apparatus. Such devices may include, for example, the clamp 45 of FIG. 8, the locking member 25 of FIGS. 4 and 5, or the detachable handle 35 of FIGS. 6 and 7, all of which were previously discussed in depth, above.

Figure 19:
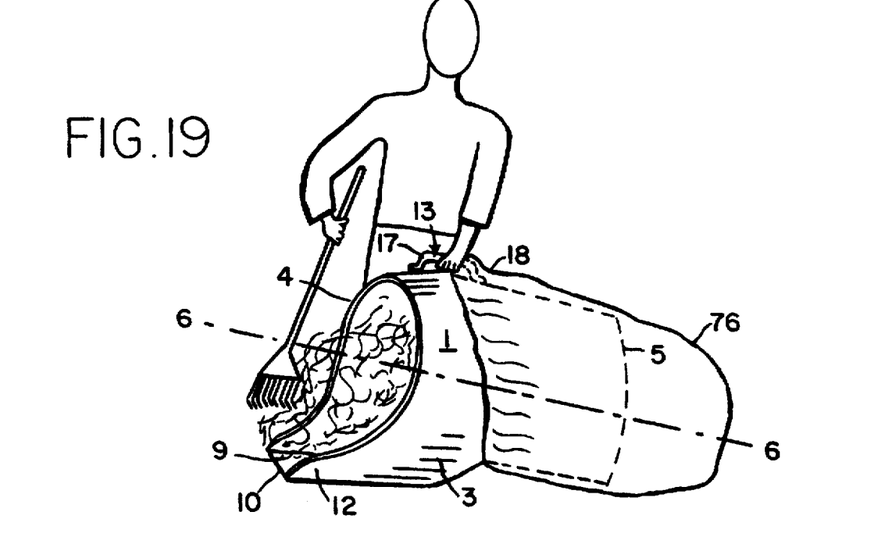
FIG. 19 illustrates a perspective view of the apparatus of FIG. 1 being filled with debris.

After a container is securely enveloped around the back opening of the apparatus, debris may be raked or otherwise deposited into the channel of the apparatus. Due to the superior stability of the apparatus in the horizontal position, the apparatus does not need to be steadied by hand, even when forcefully shoveling or raking debris into the channel. However, should one wish to hold on to the apparatus, the convenient location and orientation of the handle 13 enables one to grasp the handle 13 while raking or sweeping, without having to twist his arm in an awkward, uncomfortable manner. This point is illustrated by FIG. 19, which depicts a perspective view of the apparatus of FIG. 1 being filled with debris, as a worker grasps the handle 13 of the apparatus. Lastly, in order to extend the height from which the apparatus may be held, the previously-discussed detachable handle 35 of FIGS. 6 and 7 may be utilized.

With the apparatus in a stationary, horizontal position, the front edge 10 of the forward-projecting member 9 meets the ground, thus enabling the forward-projecting member 9 to function like a dustpan onto which debris may easily be raked or otherwise deposited. Moreover, the curved side edges 11 and 12 of the forward-projecting member 9 prevent the debris from falling off of the member 9, particularly when tipping the apparatus upright and releasing the apparatus from the container, so that the debris slides from the channel and into the container, as described previously with regard to the operation of the apparatus in the vertical position.

Operation as a Scooper

One of the drawbacks of chutes of the prior art is that one must deposit debris into the channel of the chutes either by hand or by employing a second device, such as a rake. The present invention overcomes this disadvantage by having a dual functionality to operate both as a chute, as previously described, and as a scoop, whereby the apparatus, itself, may be utilized to collect, as well as to receive, debris into its channel.

With the apparatus serving as a scooper, numerous types of debris may be collected, including, for example, leaves, litter, and snow. Furthermore, with a bag enveloped around its back perimeter, the apparatus may be used to scoop sand through its channel and into the bag, thereby reducing the enormous and exhausting labor involved in sandbagging.

The initial procedures for operating the apparatus as a scoop are substantially the same as those described with regard to operation of the apparatus as a chute in the horizontal position. This entails enveloping a container, preferably a lightweight bag, around the back opening of the apparatus, placing the apparatus on a surface in the horizontal position, and adopting the same stance as depicted in FIG. 19, but without holding a rake.

Figure 20:
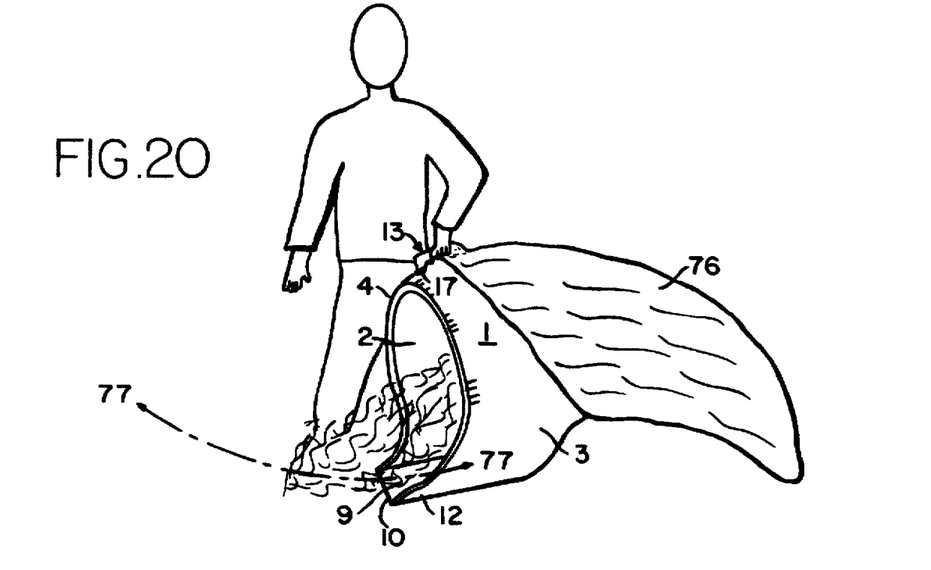
FIG. 20 illustrates a perspective view of the apparatus of FIG. 1, being operated as a scooper.

FIG. 20 illustrates a perspective view of the apparatus of FIG. 1, in which the apparatus is operated as a scooper in the direction of movement depicted by the dotted arrow 77. In this case, the forward-projecting member 9 serves as a scoop, as well as a dustpan, onto which debris may be collected. As can be viewed more clearly from the illustration of FIG. 1, the forward-projecting member 9 is ideally suited for scooping debris efficiently. The planar shape and thin front edge 10 of the forward-projecting member 9 enables it to cut into a large pile of debris without displacing much of the debris and to scrape and scoop fine, clingy and sticky debris. Furthermore, the curved side edges 11 and 12 prevent the debris from falling off of the forward-projecting member 9, as the apparatus is tipped and swiftly moved in all directions.

Unlike the horizontal mode of operation, when operating the apparatus as a scooper, the apparatus does not remain stationary throughout its use. Thus, in order to ensure that the bag 76 remains securely attached as the apparatus is swiftly moved in a scooping motion, the perimeter of the bag 76 may be pulled forward, so that the bag 76 rests partially on top of the handle 13, thereby enabling one to grip the bag 76 and the handle 13 together, using the same hand, as illustrated in FIG. 20. Alternatively, the bag 76 may be secured to the apparatus by using the locking member 25 of FIGS. 4 and 5, the detachable handle 35 of FIGS. 6 and 7, or the clamp 45 of FIGS. 8 and 9. Alternatively, a lid, such as the substantially planar lid 71 of FIG. 14, may be snapped onto the back perimeter of the casing.

The design and placement of the handle 13 is another key feature that enables the apparatus to serve as a scooper. The handle 13 is conveniently located on the outer surface 3 of the casing, at the top of the apparatus, for easy reaching. The handle 13 is optimally-oriented with its ends 17 and 18 aligned along the axis 6 of the channel, so that debris may be scooped using a minimal amount of wrist and arm motion and without having to twist the arm or wrist in an awkward and uncomfortable manner. Furthermore, the rounded shape and lightweight construction of the apparatus enables one to fluidly and efficiently scoop debris, without straining or undue bending.

Lastly, as with the two modes of operation discussed previously, once the channel of the apparatus becomes full with debris, the apparatus may simply be tipped upright so that all of the debris slides from the forward-projecting member 9, through the channel, and into the bag 76. The apparatus may then be lifted up and out of the bag, so that the debris remains intact inside the bag 76.

If the apparatus is operated using a lid, rather than a container, the last step simply comprises positioning the back opening of the apparatus over a separate container, such as a trash can, and removing the lid so that the debris slides from the channel and into the separate container.

Second Component

The second component comprises an apparatus, preferably made from a lightweight, yet sturdy plastic, such as a polyethylene, that includes a utensil for gathering debris and a housing having a distal end from which the utensil projects, a cavity into which one's hand and arm is inserted and a cylindrical handle mounted transversely inside the cavity.

First Embodiment

Figure 21:
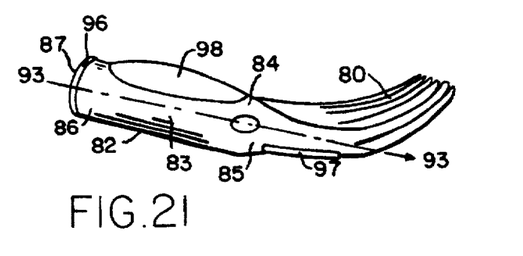
FIG. 21 illustrates a perspective view of the first embodiment of the second component.

FIG. 21 is a perspective view illustration of the first embodiment of the second component, in which the utensil comprises a plurality of tines 80 for gathering debris. The plurality of tines 80 curve collectively inward from left to right and from top to bottom in order to catch debris lying in the path of the outer left and right edges of the tines and to facilitate drawing the debris inward when raking. In addition, the slightly shovel-like curvature of the plurality of tines 80 enables the apparatus to serve as a scoop, as well as a rake.

The apparatus includes a housing 82 having interior and exterior surfaces, top and bottom sides 83 and 84, a distal end 85 from which the plurality of tines 80 project, and a proximal end 86 having a perimeter 87. The interior surface and the perimeter 87 define a cavity 88 having an opening into which one's hand and arm may be inserted, so that the top and bottom sides 83 and 84 of the housing 82 rest against the outer and inner sides, respectively, of one's forearm. The housing further comprises a handle 90 (not visible in this illustration) having a first end 91 and a second end 92 opposite to the first end 91, the handle 90 of which is mounted transversely within the cavity 88, along an axis 93 intersecting the top and bottom sides 83 and 84 of the housing 82.

Figure 22:
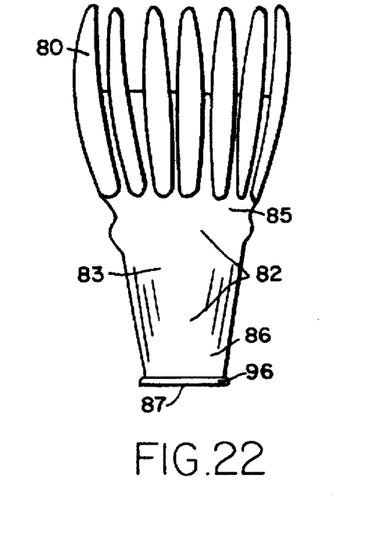
FIG. 22 illustrates a planar view of the top side of the apparatus of FIG. 21.
Figure 23:
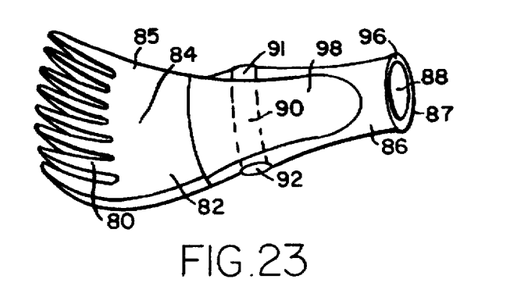
FIG. 23 illustrates a perspective view of the bottom side of the apparatus of FIG. 21.
Figure 24:
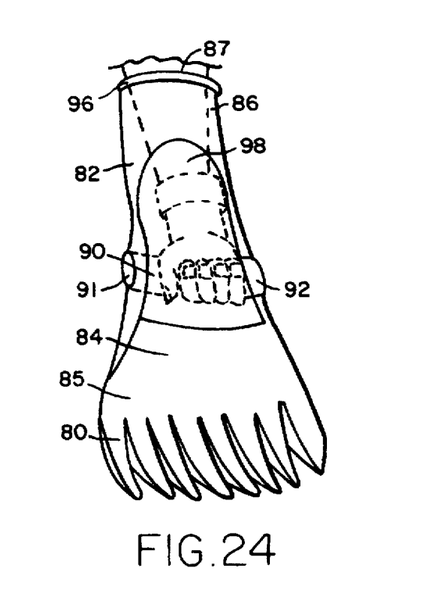
FIG. 24 illustrates a perspective view of the bottom side of the apparatus of FIG. 21, with a worker's hand and arm inserted into the apparatus.
Figure 25:
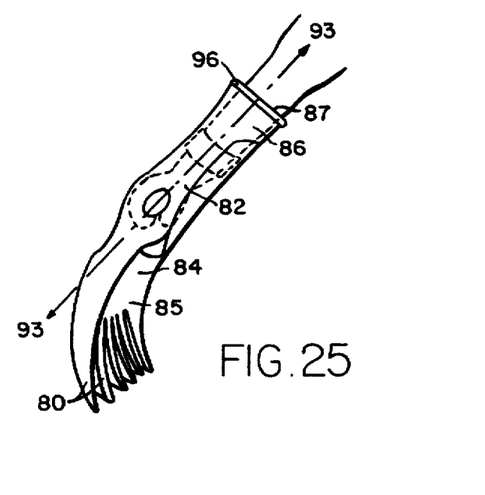
FIG. 25 illustrates a perspective side view of the apparatus of FIG. 21, with a worker's hand and arm inserted into the apparatus.

FIG. 22 is a planar illustration of the top side 83 of the apparatus of FIG. 21. FIG. 23 illustrates a perspective view of the bottom side 84 of the apparatus of FIG. 21, in which the dotted lines represent the handle 90 mounted within the cavity 88. FIGS. 24 and 25 are perspective bottom and side view illustrations, respectively, of the apparatus of FIG. 21 in which, for illustrative purposes, one's hand and arm, as positioned within the cavity 88 and around the handle 90, may be viewed.

As illustrated in FIG. 21, the apparatus may further comprise a soft cuff 96 that, by encircling the perimeter 87, prevents the perimeter 87 from rubbing and irritating one's arm during manipulation of the apparatus. Furthermore, for added comfort, the apparatus may comprise padding lined along the interior surface of the housing 82, within the cavity 88.

In addition, in order to provide additional maneuvering space for one's hand and arm inside the cavity 88, the top side 83 and/or the bottom side 84 of the housing 82 may project outward, away from the cavity 88. The outward-projecting portions of the top and bottom sides 81 and 82 are labeled, respectively, 97 and 98.

Figure 26:
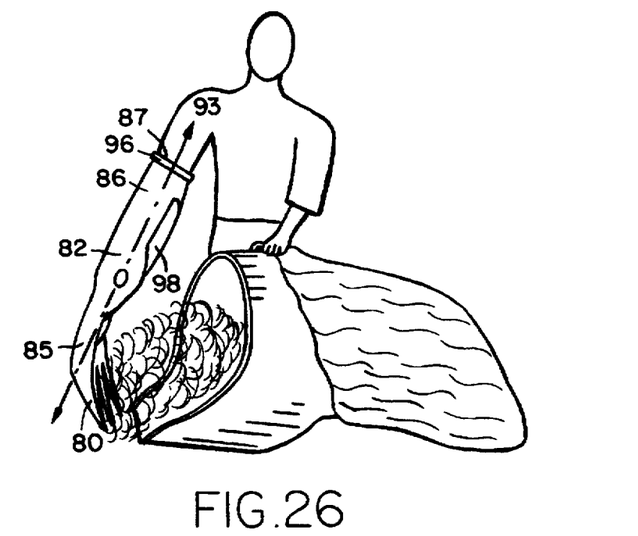
FIG. 26 illustrates a perspective view of the apparatus of FIG. 21, in which the apparatus is being operated by a worker.

In order to gather and scoop debris with the apparatus, one simply inserts his hand and arm into the cavity 88, grasps the handle 90 and, with his wrist held in a comfortably straight position, moves his arm in the direction that he wishes to move the plurality of tines, so that the apparatus functions like a natural extension of the arm, as depicted in FIG. 26, which illustrates, in perspective view, a longer version of the apparatus of FIG. 21. This harmony with one's natural movement enables the apparatus to be readily manipulated single-handedly with ease and efficiency, regardless of the length of the apparatus. Furthermore, the housing protects one's hand and arm from hazards, such as broken glass or poison ivy, that one might encounter while collecting debris.

Both the plurality of tines 80 and the housing 82 may be comprised of varying lengths, depending upon such factors as the desired degree of arm protection and the height and arm length of the person operating the apparatus. In addition, the handle 90 may be mounted within the cavity 88 at varying locations along the length of the cavity 88. By adjusting these parameters, people of all physiques can thus operate the apparatus with ease and efficiency, without having to bend.

Alternative Embodiments of the First Embodiment

In an alternative embodiment of the first embodiment, the utensil projecting from the distal end of the housing may comprise a tool such as a broom, shovel, or hoe, for example, rather than the above-described plurality of tines.

Second Embodiment

In a second embodiment, the apparatus comprises a tool for gathering debris, the tool having a first cylindrical handle and a utensil for gathering debris, the utensil projecting from the base of the first cylindrical handle. The apparatus further comprises a detachable housing having a cavity into which one's hand and arm may be inserted, a means for mounting the housing longitudinally along the first cylindrical handle, and a second cylindrical handle mounted transversely inside the cavity.

Figure 27:
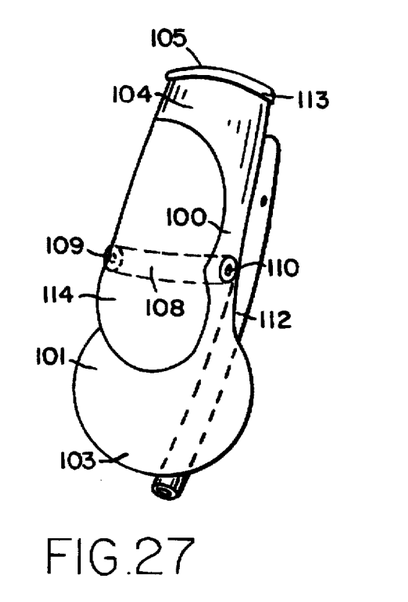
FIG. 27 is a perspective view illustration of the housing portion of a second embodiment of the second component.

FIG. 27 is a perspective view illustration of the housing portion of the apparatus. The housing 100 has interior and exterior surfaces, top and bottom sides 101 and 102, a distal end 103 and a proximal end 104 having a perimeter 105. The interior surface and the perimeter 105 define a cavity having an opening into which one's hand and arm may be inserted, so that the top and bottom sides 101 and 102 of the housing 100 rest against the outer and inner sides, respectively, of one's forearm. For illustrative purposes, the dotted lines represent those portions of the apparatus which are located within the cavity, and thus, cannot be seen from the exterior of the apparatus.

The housing further comprises a handle 108, having a first end 109 and a second end 110 opposite to the first end 109, the handle 108 of which is mounted transversely within the cavity along an axis intersecting the top and bottom sides 101 and 102 of the housing 100. The housing 100 is attached longitudinally to a hollow cylinder 112 into which a cylindrical handle of a tool may be inserted, in order to mount the housing 100 longitudinally along the cylindrical handle of the tool.

The housing 100 may further comprise a soft cuff 113 that, by encircling the perimeter 105, prevents the perimeter 105 from rubbing and irritating one's arm during manipulation of the apparatus. For added comfort, the housing 100 may also include padding lined along the interior surface of the housing 100, within the cavity. In addition, in order to provide additional maneuvering space for one's hand and arm inside the cavity, the top side 101 and/or the bottom side 102 of the housing 100 may project outward, away from the cavity. The outward-projecting portion of the top side 101 is labeled 114. Lastly, in order to further secure the apparatus, so that the housing 100 remains firmly mounted to the cylindrical handle of a tool, the housing 100 may be attached to the cylindrical handle of the tool utilizing at least one fastener, such as a bolt or wingnut.

Figure 28:
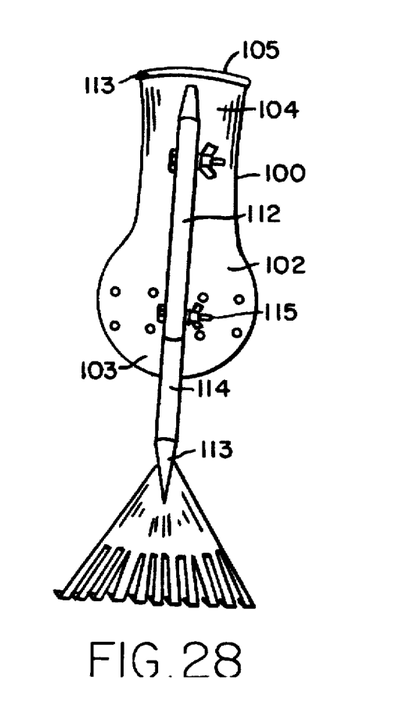
FIG. 28 illustrates a perspective view of a second embodiment of the second component.

FIG. 28 is a perspective view illustration of the bottom of the apparatus, in which the tool comprises a rake 113 having a long cylindrical handle 114 inserted into the hollow cylinder 112 of the apparatus, so that the housing 100 is longitudinally mounted onto the cylindrical handle 114. The apparatus further includes a wingnut 115, inserted through the cylindrical handle 114 and the hollow cylinder 112 to further secure the apparatus.

Figure 29:
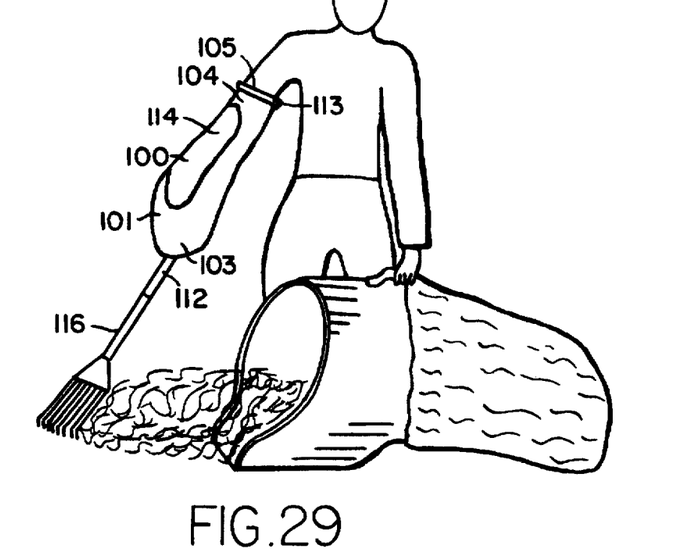
FIG. 29 illustrates a perspective view of the apparatus of FIG. 28, being operated as a rake.
Figure 30:
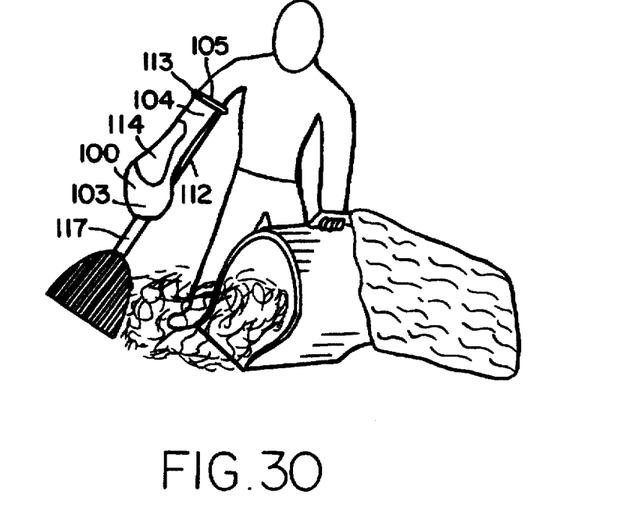
FIG. 30 illustrates a perspective view of the apparatus of FIG. 27, being operated with a broom attached to the apparatus.

The housing 100 may be longitudinally mounted to the cylindrical handle of numerous types of tools, including, for example, rakes, broom, hoes and shovels. FIG. 29 illustrates a perspective view of the apparatus of FIG. 27 in use, in which the housing 100 is mounted to a rake 116. FIG. 30 illustrates a perspective view of the apparatus of FIG. 27 in use, in which the housing 100 is mounted to a broom 117.

In order to gather and scoop debris with the apparatus, one simply inserts his hand and arm into the cavity 106, grasps the handle 108 and, with his wrist held in a comfortably straight position, moves his arm in the direction that he wishes to move the tool, so that the apparatus functions like a natural extension of the arm, as depicted in FIGS. 29 and 30. This harmony with one's natural movement enables the apparatus to be readily manipulated single-handedly with ease and efficiency, regardless of the length of the apparatus. Furthermore, the housing protects one's hand and arm from hazards, such as broken glass or poison ivy, that one might encounter while collecting debris.

Preferred Embodiment of the Invention

Because of the dual-functionality of both the first and the second component, both components may be utilized independently from each other and from other devices for collecting debris. However, in the preferred embodiment of the invention, the two components are operated in concert with each other for maximum ease and efficiency in collecting debris.

For example, as illustrated in FIG. 26, in order to collect and dispose of debris, one may choose to operate the first component, comprising a chute having a forward-projecting scoop, along with the first embodiment of the second component in which the utensil comprises a plurality of tines curved like a shovel. Thus, using the second component, one may rake and scoop debris into the casing of the first component, while simultaneously manipulating the first component to scoop up the debris, as well as to receive the debris deposited into it by the second component.

Alternatively, as illustrated in FIG. 30, one may choose to operate the first component comprising a chute having a forward-projecting scoop, along with the second embodiment of the second component, in which the detachable housing is mounted onto the handle of a broom, for example. Thus, using the second component, one may sweep debris into the casing of the first component, while simultaneously manipulating the first component to scoop up the debris, as well as to receive the debris swept into it by the second component.

What is claimed is:

1. An apparatus for collecting debris, the apparatus comprising:
   a casing having an inner surface, an outer surface, a front perimeter and a back perimeter shorter than the front and back perimeters defining a channel having a front opening and back opening opposite to the front opening; and
   a substantially planar member for scooping or guiding debris into the channel, the member projecting forward from a portion of the front perimeter, the member having a front edge and two side curved edges located opposite to each other and perpendicular to the front edge; and
   a handle mounted to the outer surface of the casing, opposite to the forward-projecting member, the mounted handle having inner and outer surfaces, the inner and outer surfaces having:
      a first end mounted to the outer surface of the casing; and
      a second end opposite to the first end, the first and second ends of the mounted handle being mounted to the outer surface of the casing along a longitudinal axis intersecting the front and back perimeters of the casing, the inner surface of the mounted handle and the outer surface of the casing defining the aperture therethrough, further comprising a lid having a perimeter, the lid being capable of attaching to the back perimeter of the apparatus, so that debris may be contained within the channel of the apparatus.

2. The apparatus of claim 1, in which the means for attaching the lid to the apparatus comprises a groove formed within the back perimeter of the casing, the groove being dimensioned so that the perimeter of the lid may be inserted into the groove.

3. The apparatus of claim 1, in which the lid comprises a substantially planar lid onto which the apparatus may be stood.

4. The apparatus of claim 1, in which the perimeter of the lid further comprises an outward-projecting ridge dimensioned to fit against the back perimeter of the casing.

5. An apparatus for collecting debris, the apparatus comprising:
   a casing having an inner surface, an outer surface, a front perimeter and a back perimeter shorter than the front and back perimeters defining a channel having a front opening and back opening opposite to the front opening; and
   a substantially planar member for scooping or guiding debris into the channel, the member projecting forward from a portion of the front perimeter, the member having a front edge and two side curved edges located opposite to each other and perpendicular to the front edge; and a handle mounted to the outer surface of the casing, opposite to the forward-projecting member, the mounted handle having inner and outer surfaces, the inner and outer surfaces having:

a first end mounted to the outer surface of the casing; and a second end opposite to the first end, the first and second ends of the mounted handle being mounted to the outer surface of the casing along a longitudinal axis intersecting the front and back perimeters of the casing, the inner surface of the mounted handle and the outer surface of the casing defining the aperture therethrough, further comprising a container for enveloping the back opening of the apparatus so that the debris channeled through the front opening may be collected into the container further comprising a means for securing the container to the apparatus in which the means for securing the container to the apparatus comprises:

a locking member having a first end and a second end, the first end being mounted on the first end of the mounted handle, the locking member being dimensioned to overlap a portion of the outer surface of the mounted handle, the locking member and the second end of the mounted handle defining a mouth having:

an open position for inserting a portion of the container into the mouth, the second end of the locking member being positioned at an angle above the mounted handle in the open position; and a closed position for trapping a portion of the container between the locking member and the mounted handle, both ends of the locking member snugly overlapping both ends of the mounted handle in the closed position, the locking member being movable between the open position and the closed position.

6. The apparatus of claim 5, the locking member further comprising a tip projecting outward from the second end of the locking member, the locking member being movable between the open position and the closed position by applying a force onto the outward projecting tip of the locking member.

7. An apparatus for collecting debris, the apparatus comprising:

a casing having an inner surface, an outer surface, a front perimeter and a back perimeter shorter than the front and back perimeters defining a channel having a front opening and back opening opposite to the front opening; and a substantially planar member for scooping or guiding debris into the channel, the member projecting forward from a portion of the front perimeter, the member having a front edge and two side curved edges located opposite to each other and perpendicular to the front edge; and a handle mounted to the outer surface of the casing, opposite to the forward-projecting member, the mounted handle having inner and outer surfaces, the inner and outer surfaces having:

a first end mounted to the outer surface of the casing; and a second end opposite to the first end, the first and second ends of the mounted handle being mounted to the outer surface of the casing along a longitudinal axis intersecting the front and back perimeters of the casing, the inner surface of the mounted handle and the outer surface of the casing defining the aperture therethrough, further comprising a detachable handle having:

a first end having a handle slot dimensioned to engage the mounted handle; and a second end having a casing slot dimensioned to engage a portion of the back perimeter of the casing, the detachable handle having a greater height and a greater length than the mounted handle.

8. An apparatus for collecting debris, the apparatus comprising:

a casing having an inner surface, an outer surface, a front perimeter and a back perimeter shorter than the front and back perimeters defining a channel having a front opening and back opening opposite to the front opening; and a substantially planar member for scooping or guiding debris into the channel, the member projecting forward from a portion of the front perimeter, the member having a front edge and two side curved edges located opposite to each other and perpendicular to the front edge; and a handle mounted to the outer surface of the casing, opposite to the forward-projecting member, the mounted handle having inner and outer surfaces, the inner and outer surfaces having:

a first end mounted to the outer surface of the casing, and a second end opposite to the first end, the first and second ends of the mounted handle being mounted to the outer surface of the casing along a longitudinal axis intersecting the front and back perimeters of the casing, the inner surface of the mounted handle and the outer surface of the casing defining the aperture therethrough, further comprising a container for enveloping the back opening of the apparatus, so that the debris channeled through the front opening may be collected into the container and further comprising a means for securing the container to the apparatus in which the means for securing the container to the apparatus comprises a clamp having a first end and second end opposite to the first end, the clamp being dimensioned to partially encircle and to apply an inward force against the container and the casing around the longitudinal axis of the casing in which the casing further comprises an outward projecting ridge for holding the clamp in a desired position around the longitudinal axis of the casing, the outward projecting ridge being located between the clamp and the back perimeter of the casing the outward projecting ridge partially encircling the apparatus around the longitudinal axis of the casing.

* * * * *